No. 805,709. PATENTED NOV. 28, 1905.
H. J. CALDWELL & J. R. BARR.
APPARATUS FOR PURIFYING, CONDITIONING, AND DRYING GRAIN.
APPLICATION FILED SEPT. 2, 1902.
2 SHEETS—SHEET 2.
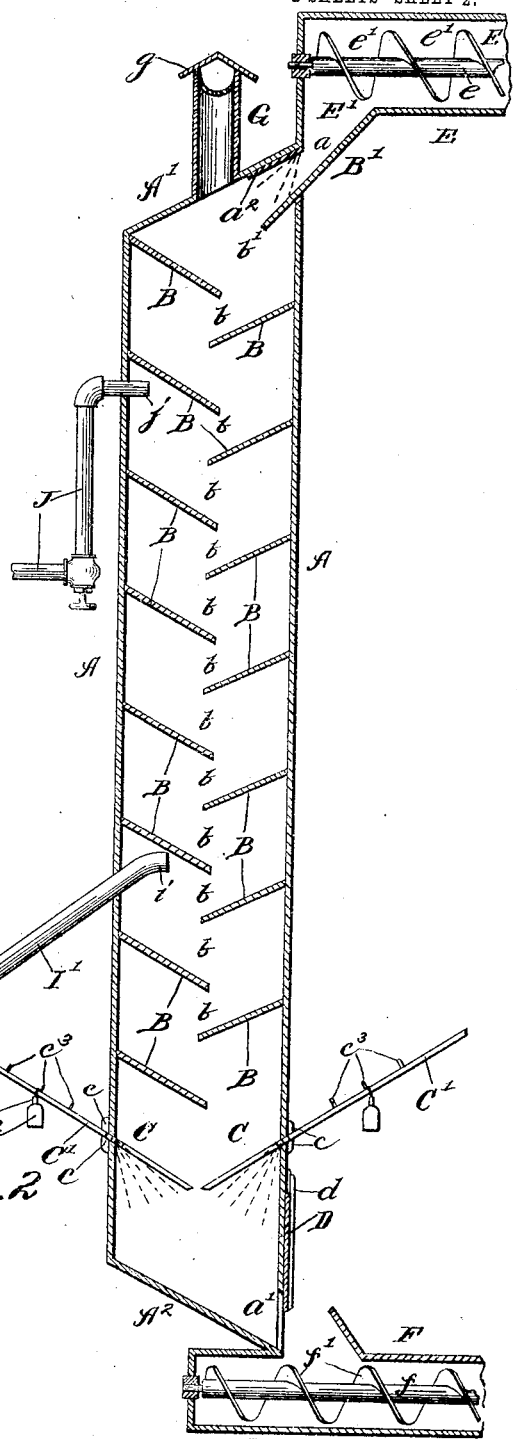
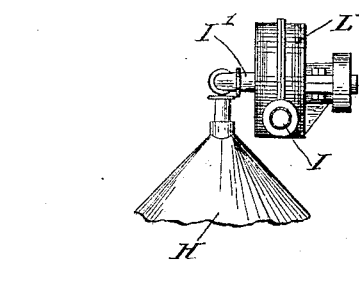
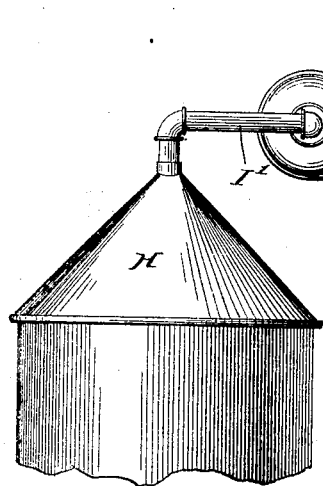

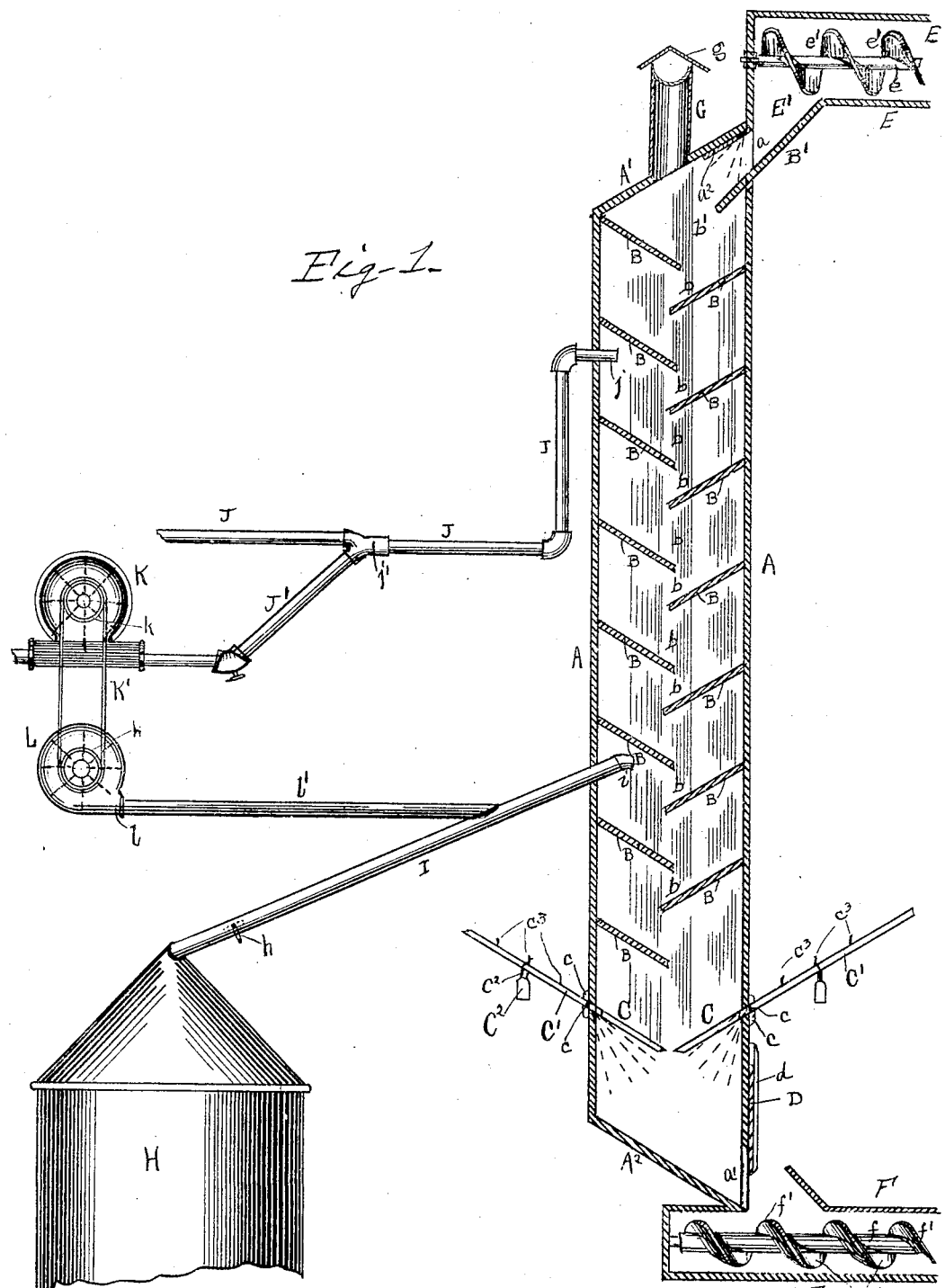

UNITED STATES PATENT OFFICE.

HARRY J. CALDWELL AND JAMES R. BARR, OF EARLPARK, INDIANA.

APPARATUS FOR PURIFYING, CONDITIONING, AND DRYING GRAIN.

No. 805,709.     Specification of Letters Patent.     Patented Nov. 28, 1905.

Application filed September 2, 1902. Serial No. 121,816.

*To all whom it may concern:*

Be it known that we, HARRY J. CALDWELL and JAMES R. BARR, citizens of the United States, residing at Earlpark, in the county of Benton and State of Indiana, have invented certain new and useful Improvements in Apparatus for Purifying, Conditioning, and Drying Grain, of which the following is a specification.

The object of this invention is to construct a simple, effective, and reliable apparatus by means of which wheat, corn, oats, barley, rye, and other grain and cereals and seeds can be subjected to treatment by which the treated grain will be cleansed, purified, sweetened, and restored to condition, employing in the treatment the fumes of sulfur or other chemical combined with air under pressure after first subjecting the grain to a moistening, preferably by steam, though for some treatment air alone, either hot or cold, may be used, or steam and air, or air and the fumes, so long as the treatment is of a character for the proper and beneficial action on the grain and which will not destroy or impair the grain.

The invention consists of the features of construction and combinations of parts hereinafter described and claimed.

In the drawings, Figure 1 is a view, partly in side elevation and partly in section, of my apparatus in its preferred form. Fig. 2 is a view, partly in side elevation and partly in section, of a modified form of my apparatus in which the fan L' is interposed directly in the fumes-passage, the pipe I' leading from the furnace H to the eye of the fan and from the fan to the upright conduit. In Fig. 3 I have shown a view on the line 3 3 of Fig. 2 looking in the direction indicated by the arrows.

Like letters of reference indicate the same parts in the several figures of the drawings.

Referring by letter to the accompanying drawings, the spout or conduit A, through which the grain passes or descends for treatment, is preferably square or rectangular in cross-section and can be made of wood or other suitable material with an interior dimension as may be desired or required. The spout or conduit at the upper end has an inlet or opening $a$, controlled, as shown, by a swing-gate $a^2$, and at its lower end has an outlet or opening $a'$ and is provided with a closed top A', which, as shown, is inclined, and with a closed bottom $A^2$, having, as shown, an inclination toward the outlet. The interior of the spout or conduit has therein projecting inward from two opposite sides a series of downwardly-inclined deflectors B, preferably made of boards so arranged as to have the inner edge of a deflector on one side project into the space between two deflectors on the opposite side, so that the inner edges of alternate deflectors or boards pass each other, forming a series of openings or mouths $b$ between the series of deflectors or boards and resulting in a zigzag or sinuous continuous passage from the top to the bottom of the spout or conduit. An upper board B' extends from the outside of the spout or conduit through the inlet $a$, and its inner edge terminates so as to leave a mouth or opening $b'$ between it and the upper deflector or board on the opposite side of the deflector or spout.

At the lower end of the spout or conduit just above the outlet is located a pair of discharge-controlling gates. Each gate C, as shown, has an arm or lever C', pivotally mounted by a pin or pivot $c$ between ears or supports $c'$, and each arm or lever C' has thereon an adjustable weight $C^2$, each weight having a loop or link $c^2$ for suspending the weight from the arm or lever, and, as shown, each weight is held in an adjusted position by engagement of the loop or link with one of a series of pins $c^3$ on the arm or lever, but could be held by notches or otherwise. The gates are of a width to tightly close their abutting edges normally, and the gates are opened by the grain descending and striking against the upper face, and the amount of opening will depend on the adjustment of the weights—an in adjustment of the weights opening the gates with a light pressure of grain and an out adjustment of the weights opening the gates with a heavy weight of grain, thus enabling the gates to open and be held open as required for the passage of different kinds of grain and to suit the discharge of the grain. The weights regulate the opening of the gates, and instead of weights other controlling means can be employed. The outlet $a'$, as shown, is controlled as to the outflow of grain by a cut-off D, sliding in guideways $d$, so that the cut-off can be raised or lowered to increase or decrease the size of the outlet and regulate the outflow of the grain.

A feed-tube E, having therein on a shaft $e$ a worm or screw $e'$, is located at the upper end of the spout or conduit to feed the grain into the inlet $a$ for the grain to descend in the spout or conduit, the grain passing from the feed-tube E through the mouth or opening E' and flowing down the incline B' through the inlet $a$, and the grain descends in the spout or conduit, passing from deflector to deflector, giving the grain a retarded flow and causing it to descend in a thin continuous stream from the top to the bottom of the spout or conduit, by which the grain is conducted from the inlet to the outlet under conditions best adapted for treatment. A discharge-tube F, having therein on a shaft $f$ a worm or screw $f'$, is located at the bottom of the spout or conduit in communication with the outlet $a'$, by means of which tube and its worm or screw the grain after treatment is taken and deposited or removed for storage or other disposition. An exhaust G, having a cap or cover $g$, is located on the top A' of the spout or conduit, and through this exhaust the steam, air, and fumes or vapors after ascending in the tube or conduit can escape.

A furnace H, of suitable construction for burning sulfur or other fume or vapor producing chemical or material, sulfur being preferred, for cleaning, brightening, purifying, and conditioning the grain, is located in proximity to the spout or conduit, and from the top of this furnace in the arrangement shown a pipe I leads into the spout or conduit at a point about the central horizontal line or at any point above the outlet $a'$ and the controlling-gates C, which pipe conducts the fumes or vapors from the furnace into the spout or conduit. As shown, a controlling damper or valve $h$ is located in the pipe to control the passage of the fumes or vapors, and the inner or discharge end $i$ of the pipe within the spout or conduit has a downward turn given thereto.

A steam-pipe J, leading from any suitable source of steam-supply, has its inner or discharge end $j$ entered into the spout or conduit at the upper end and below the inlet $a$ and supplies steam for moistening the grain as it enters the spout or conduit. As shown, a branch steam-pipe J' leads into the main steam-pipe J at a coupling $j''$, and both steam-pipes can be provided with suitable valves for controlling the passage of steam through the pipes. The branch steam-pipe J' has connected therewith an undershot power wheel or motor K, driven by the pressure of the steam passing through the pipe. The shaft of the power wheel or motor has thereon a pulley or driving-wheel $k$, over which runs a driving-belt K', which belt drives a pulley or wheel $k'$ on the shaft of a blow or blast fan L for air, the discharge $l$ of which fan is connected by a pipe $l'$ with the lead or supply pipe for the fumes, so that air under pressure is forced through the pipe I, drawing the fumes or vapors from the furnace and projecting a stream of commingled air and fumes or vapors into the spout or conduit A to pass upwardly therein and circulate through and come in contact with the descending grain for the air and fumes to act on the grain. The arrangement shown utilizes the pressure of the steam which is supplied to the spout or conduit to drive the blast or blow fan; but the fan could be driven from any suitable source of power, and instead of the connecting-pipe $l$ the pipe could be interposed in and connected direct to the lead or supply I.

The operation is as follows: Steam is admitted to the supply-pipe J J' to operate the power wheel or motor and to project the steam into the interior of the spout or conduit at the discharge end $j$ of the pipe. The sulfur or other chemical or material for producing the fumes or vapors for the treatment of the grain is placed in the furnace and burned therein for the fumes or vapors to enter the lead or connecting pipe I. The power wheel or motor drives the blast or blow fan, forcing air under pressure into the lead or connecting pipe to commingle with the fumes or vapors and project the commingled air and fumes or vapors into the interior of the spout or conduit at the discharge end $i$ of the pipe. The grain is fed into the spout or conduit at the inlet $a$ by the feed-tube and its worm or screw or other suitable feeding device or mechanism and descends in the spout or conduit, passing from deflector to deflector. The grain as it descends is brought in contact with the steam, and thereby moistened as it first enters the spout or conduit and brought into proper condition for treatment with the air and fumes or vapors. The moistened grain as it descends comes in contact with the projected stream of air and fumes or vapors which circulate through the grain for the sulfurous or other fumes or vapors to act and purify, condition, and cleanse the grain, the air and fumes or vapors flowing or passing upwardly in contact with and circulating through the stream of descending grain and escaping with the steam at the ventilator or exit at the top of the spout or conduit. The steam moistens the grain at a point above that for the injection of the treating fumes or vapors, so that the fumes or vapors can act properly, and the grain as it reaches the outlet will be purified, conditioned, and cleansed, and also practically dried, as the heated fumes or vapors and the air will also serve to dry, as well as purify, condition, and cleanse, and the treated grain as it is discharged at the outlet is removed or carried away by the worm or screw or other suitable device or mechanism.

The apparatus is simple in construction and at the same time is efficient in operation for the purpose intended, and where it is only desired to moisten the grain the furnace and air-blower need not be operated, and for air alone the steam-supply to the spout or conduit can be shut off and the furnace not operated, and for air and fumes or vapors the steam-supply to the spout or conduit can be shut off and the fan and furnace be operated, rendering it possible to use steam, air, and fumes, or steam alone, or air alone, or air and vapors or fumes in the treatment of the grain.

The controlling or swinging gate $a^2$ regulates the quantity of grain passing through the inlet $a$ into the conduit A, and in addition it performs the office of a safeguard against the steam, air, and fumes from passing out through the feed trough or spout E to the place from which the grain is taken, forcing the steam, air, and fumes or vapors to escape at the exit or exhaust G, which is important, as steam and fumes are objectionable in the storehouse, elevator, or other place from which the grain is taken.

The controlling or swing gate $a^2$ is set or adjusted to allow only a given or predetermined flow of grain into the spout or conduit, which grain passing down falls upon the controlling-gates C, maintaining a sufficient quantity of grain above and upon the gates to prevent the steam, air, and fumes or vapors from escaping downwardly and passing out with the discharged treated grain. The amount of grain immediately above and resting on the gates C, with the weights $C^2$ properly adjusted, will act to open the gates automatically and only to an extent to furnish an escape for the grain coinciding in rapidity and quantity to the flow of grain at the inlet $a$ into and down through the spout or conduit, so that a proper body of grain will rest upon the controlling-gates sufficient to prevent the escape downwardly of the steam, air, and fumes or vapors and at the same time allowing the treated grain to discharge as rapidly as it enters the spout or conduit at the feed-inlet. It will be seen that by means of the controlling-gate at the inlet and the controlling-gates at the lower end of the spout or conduit the passage of the grain through the conduit is regulated so that the incoming grain and the outflowing grain, in conjunction with the gates at the inlet and at the bottom of the spout or conduit, form a seal against the escape of steam, air, and fumes or vapors at either the inlet or outlet for the grain, forcing the steam, air, and fumes or vapors to pass upwardly and escape at the exhaust or ventilator provided for that purpose.

It is obvious that steam-pressure may be used as a motive force to drive the wheel K in various convenient manners other than the precise manner shown in the drawings and that other modifications may be made as matters of shop convenience without departing from the spirit of our invention.

What we claim as new, and desire to secure by Letters Patent, is—

1. In an apparatus for purifying, conditioning and drying grain, the combination of a spout or conduit provided on its interior with a zigzag passage and having an inlet at one end and an outlet at the opposite end, a pipe supplying steam to the spout or conduit at one side of the center thereof for moistening grain passing therethrough, a furnace for generating the treating-fumes, a pipe leading from the furnace into the spout or conduit at the opposite side of the center thereof to the steam-supply pipe, and means for projecting air under pressure into the last-named pipe and forcing the fumes to circulate through and come in contact with the grain, substantially as described.

2. In an apparatus for purifying, conditioning and drying grain, the combination of a spout or conduit provided on its interior with a zigzag passage and having an inlet at its upper end and an outlet at its lower end, a pipe supplying steam to the spout or conduit above the center thereof for moistening the grain passing therethrough, a furnace for generating the treating-fumes, a pipe leading from the furnace into the spout or conduit below the center thereof, and means for projecting air under pressure into the pipe for the fumes, forcing the fumes to circulate through and in contact with the descending grain, substantially as described.

3. In an apparatus for purifying, conditioning and drying grain, the combination of a spout or conduit having an inlet at its upper end and an outlet at its lower end, a series of inclined deflectors arranged within and extending inwardly from two opposite sides of the spout or conduit with their inner edges alternately passing each other, a pipe supplying steam to the interior of the spout or conduit near its upper end and below the inlet, a furnace for generating the treating-fumes, a pipe leading from the furnace into the interior of the spout or conduit at its lower half and above the outlet, and means for projecting air under pressure through the pipe for the fumes, forcing the fumes to circulate through and come in contact with the descending grain, substantially as described.

4. In an apparatus for purifying, conditioning and drying grain, the combination of a spout or conduit having an inlet at its upper end and an outlet at its lower end, a series of inclined deflecting-boards arranged within and extending inwardly from two opposite sides of the spout or conduit with their inner edges alternately passing each other, a pipe supplying steam to the interior of the spout or conduit near its upper end and below the inlet, a furnace for generating the treating-fumes, a pipe leading from the furnace into the interior of the spout or conduit at its lower half and above the outlet, and an air-blast fan in communication with the pipe for the fumes for projecting a blast of air through the pipe carrying with it the fumes into the spout or conduit for the air and fumes to circulate through and come in contact with the descending grain, substantially as described.

5. In an apparatus for purifying, conditioning and drying grain, the combination of a spout or conduit having an inlet at its upper end and an outlet at its lower end, a series of inclined deflecting-boards arranged within and extending inwardly from two opposite sides of the spout or conduit with their inner edges alternately passing each other, a pipe supplying steam to the interior of the spout or conduit near its upper end below the inlet, a furnace for generating the treating-fumes, a pipe leading from the furnace into the interior of the spout or conduit at its lower half and above the outlet, an air-blast fan in communication with the pipe for the fumes for projecting a blast of air through the pipe carrying with it the fumes into the spout or conduit for the air and fumes to circulate through and in contact with the descending grain and a motor actuated from the steam passing through the supply-pipe for driving the fan, substantially as described.

6. An apparatus for the purpose set forth, comprising a vertically-elongated purifying-chamber, means for continuously supplying grain to the top and withdrawing it from the bottom of said chamber, means for supplying sulfur fumes commingled with air under pressure to said chamber, means for supplying a dampening agent to the said chamber above the inlet of the commingled sulfur fumes and air, and means for controlling the supply of the sulfur fumes, of the air and of the dampening agent to said chamber.

7. An apparatus for the purpose set forth, comprising a vertically-elongated purifying-chamber, means for continuously supplying grain to the upper, and withdrawing it from the lower, part of the chamber, a furnace for generating sulfur fumes, connected with the purifying-chamber by a passage, means in said passage for withdrawing fumes from the furnace and forcing them into the chamber, controllable means for commingling air with said sulfur fumes before entering said chamber, and means for dampening the grain before it is acted upon by the fumes entering said chamber.

8. In an apparatus for purifying, conditioning and drying grain, the combination of a spout or conduit having an inlet at its upper end and an outlet at its lower end, means for retarding and agitating the grain during its passage through said conduit, means for supplying steam to the interior of the spout or conduit below the inlet, and means for supplying air under pressure commingled with fumes or vapors to the interior of the spout or conduit above the outlet and means for separately controlling the amount of air commingled with said fumes below the point of the steam-supply, substantially as described.

9. In an apparatus for purifying, conditioning and drying grain, the combination of a spout or conduit closed at its lower end and having an exhaust-opening at its upper end having an inlet at its upper end and an outlet at its lower end, a series of inclined deflectors within the spout or conduit, means for supplying steam to the interior of the spout or conduit below the inlet, and means for supplying air under pressure commingled with fumes or vapors to the interior of the spout or conduit above the outlet and means for separately controlling the amount of air commingled with said fumes below the point of the steam-supply, a gate for the inlet controlling the inflow of the grain, and a pair of gates in the spout or conduit at its delivery end above the outlet controlling the outflow of the grain coincidingly with the inflow, substantially as described.

10. In an apparatus for purifying, conditioning and drying grain, the combination of a spout or conduit, having an inlet at its upper end and an outlet at its lower end, a series of inclined deflectors located within and projecting inwardly from opposite sides of the spout or conduit, a pair of downwardly-opening gates at the delivery end of the spout or conduit, controlling the discharge of the grain, means for supplying steam to the interior of the spout or conduit below the inlet, means for projecting air under pressure commingled with treating-fumes into the interior of the conduit above the outlet, and an escape for steam, air and fumes at the upper end of the conduit, substantially as described.

11. In an apparatus for purifying, conditioning and drying grain, the combination of a spout or conduit, having an inlet at its upper end and an outlet at its lower end, a series of inclined deflectors located within and projecting inwardly from opposite sides of the spout or conduit, a gate controlling the admission of the grain at the inlet, a pair of downwardly-opening gates at the delivery end of the spout or conduit controlling the discharge of the grain at this outlet, a pipe for supplying steam to the interior of the spout or conduit below the inlet, a furnace for burning a fume or vapor producing substance, a pipe leading from the furnace into the spout or conduit below the steam-supply and above the lower controlling-gates, a blow-fan connected with the fume-carrying pipe for projecting air under pressure commingled with treating-fumes into the interior of the conduit above the outlet, and an escape for steam, air and fumes at the upper end of the conduit, substantially as described.

HARRY J. CALDWELL.
JAMES R. BARR.

Witnesses:
 WM. BOLDMAN,
 JAMES BOLDMAN.